(12) United States Patent
Seme et al.

(10) Patent No.: US 12,344,547 B2
(45) Date of Patent: Jul. 1, 2025

(54) ENAMELED MINERAL SUBSTRATE AND METHOD FOR MAKING SAME

(71) Applicant: EUROKERA S.N.C., Château-Thierry (FR)

(72) Inventors: Charlène Seme, Chierry (FR); Loïc Delaye, Fere-en-Tardenois (FR)

(73) Assignee: EUROKERA S.N.C., Chateau Thierry (FR)

(*) Notice: Subject to any disclaimer, the term of this patent is extended or adjusted under 35 U.S.C. 154(b) by 0 days.

(21) Appl. No.: 18/702,630

(22) PCT Filed: Oct. 18, 2022

(86) PCT No.: PCT/EP2022/078994
§ 371 (c)(1),
(2) Date: Apr. 18, 2024

(87) PCT Pub. No.: WO2023/066945
PCT Pub. Date: Apr. 27, 2023

(65) Prior Publication Data
US 2025/0115515 A1    Apr. 10, 2025

(30) Foreign Application Priority Data
Oct. 19, 2021  (FR) ........................... 2111100

(51) Int. Cl.
*B32B 15/04*   (2006.01)
*B32B 17/06*   (2006.01)
(Continued)

(52) U.S. Cl.
CPC .......... *C03C 17/04* (2013.01); *B41M 5/0047* (2013.01); *B41M 5/007* (2013.01);
(Continued)

(58) Field of Classification Search
CPC ..................... B41M 5/0047; C03C 2218/119
(Continued)

(56) References Cited

U.S. PATENT DOCUMENTS 3,961,120 A * 6/1976 Hearn ................. C03C 17/04
                                                     428/428
9,701,576 B2   7/2017  Schott
(Continued)

FOREIGN PATENT DOCUMENTS

EP    EP 3 067 333 A1   9/2016
EP    EP 3 067 334 A1   9/2016
(Continued)

OTHER PUBLICATIONS

International Search Report as issued in International Patent Application No. PCT/EP2022/078994, dated Feb. 15, 2023.
(Continued)

*Primary Examiner* — Lauren R Colgan
(74) *Attorney, Agent, or Firm* — Pillsbury Winthrop Shaw Pittman LLP (57) ABSTRACT

A mineral substrate includes, on at least one of the surfaces thereof, an inorganic enamel capable of withstanding metallic friction. The inorganic enamel has a total roughness less than or equal to 2 µm, and the edge of the inorganic enamel projecting from the surface of the glass-ceramic substrate has a topographic slope value, expressed as a percentage, less than or equal to 1.4%.

18 Claims, 4 Drawing Sheets

(51) Int. Cl.
*B41M 5/00* (2006.01)
*C03C 17/04* (2006.01)

(52) U.S. Cl.
CPC ...... *C03C 2217/72* (2013.01); *C03C 2217/78* (2013.01); *C03C 2218/119* (2013.01)

(58) Field of Classification Search
USPC .......................................................... 428/428
See application file for complete search history.

(56) References Cited

U.S. PATENT DOCUMENTS

2016/0264455 A1* 9/2016 Weber ..................... C03C 17/04
2021/0115281 A1 4/2021 Guedon et al.

FOREIGN PATENT DOCUMENTS

| FR | DR FR 2 858 974 A1 | 2/2005 |
| WO | WO 2016/008848 A1 | 1/2016 |
| WO | WO 2016/110724 A1 | 7/2016 |
| WO | WO 2019/219691 A1 | 11/2019 |

OTHER PUBLICATIONS

Written Opinion of the International Searching Authority as issued in International Patent Application No. PCT/EP2022/078994, dated Feb. 15, 2023.

* cited by examiner

ENAMELED MINERAL SUBSTRATE AND METHOD FOR MAKING SAME

CROSS-REFERENCE TO RELATED APPLICATIONS

This application is the U.S. National Stage of PCT/EP2022/078994, filed Oct. 18, 2022, which in turn claims priority to French patent application number 2111100 filed Oct. 19, 2021. The content of these applications are incorporated herein by reference in their entireties.

TECHNICAL FIELD

The present invention relates to a mineral substrate comprising, on at least one of its surfaces, an inorganic enamel resistant to metallic friction. It also relates to a method for manufacturing such a substrate.

TECHNICAL BACKGROUND

Mineral substrates such as glass-ceramics or colored special glasses are popular in numerous fields for their aesthetic qualities and their physical/chemical properties, in particular their low coefficient of thermal expansion and their resistance to thermal shocks.

They are particularly used in kitchen equipment, in particular in the form of a flat substrate, for example as a cooking surface in cooking devices, glazed oven walls, and work surfaces in the working surfaces, tables or furniture for the preparation of foods.

As examples, in kitchen equipment, glass-ceramics, composite materials comprising an amorphous phase wherein crystalline phases are dispersed, are mineral substrates that are very widely appreciated because of their very good resistance to thermal shocks, their very low coefficient of expansion and their mechanical strength. As a cooking surface and/or working surface in cooking devices, they are generally based on lithium aluminosilicate with a dispersion of crystalline phases based on β-quartz and/or β-spodumene in their amorphous matrix.

Depending on the desired use for kitchen equipment, mineral substrates can be associated with electrical and/or electronic devices such as heating and/or lighting means, and/or be provided with a certain number of accessories, such as controls, sensors and displays, which allow interaction between the user and the devices wherein these substrates are incorporated.

It is common to carry out a enameling of the surface of the mineral substrates for decorative purposes and/or to delimit certain functional areas such as the control, signaling and/or heating zones for cooking devices.

Enameling is commonly carried out using screen printing or inkjet printing methods.

In the field of mineral substrates used in and/or near cooking devices, for durability and aesthetic reasons, an enamel preferentially adheres properly to the substrate on which it is deposited and has an appreciable resistance to mechanical and/or chemical stresses that it is likely to undergo under the conditions in which the cooking devices are used.

In particular, enamels are generally sought which are capable of withstanding repeated exposure to food and/or chemical products as well as mechanical stresses such as metallic friction caused by repeated movements of kitchen utensils such as pots or pans.

The state of the art provides numerous examples of enamel compositions, mineral inks and/or mineral pastes as well as examples of suitable enameling methods.

FR 2 858 974 A1 [SCHOTT AG [DE]] 25.02.2005 describes a glass-ceramic cooking surface provided with an intense artificial black decorative effect that is not very rough.

WO 2016/008848 A1 [SCHOTT AG [DE]] 21.01.2016 describes a mineral ink suitable for printing decorative effects on a glass-ceramic substrate with a low coefficient of expansion. This mineral ink makes it possible to obtain enamels having better resistance to bending and flaking.

WO 2016/110724 A1 [FENZI SPA [IT]] 14.07.2016 describes a mineral ink composition for printing decorative effects on a glass-ceramic substrate. This mineral ink makes it possible to obtain enamels chemically resistant to acids, bases and radiation, and mechanically resistant to abrasion and delamination.

EP 3 067 334 A1 [SCHOTT AG [DE]] 14.09.2016 describes a decorative enamel for a glass-ceramic substrate making it possible to reduce the noise generated by the movement of the kitchen utensils on the surface of the enamel.

WO 2019/219691 A1 [EUROKERA [FR]] 21.11.2019 describes a mineral ink for printing glass-ceramic substrates. This ink makes it possible to obtain enamels resistant to food products, to detergents, to the combined effects of repeated exposures to these products and heating cycles, and to temperatures above 800° C. used during the manufacture of glass-ceramic substrates.

SUMMARY OF THE INVENTION

Technical Problem

The metal friction related to the repeated movements of the kitchen utensils such as pots or pans on the surface of the mineral substrates in and/or near the cooking devices cause the appearance of metal marks or traces on the decorative enamels. These metal marks or traces are generally metal particles which, under the effect of repeated friction of the metal utensils on the enamels, have been torn away from said metal utensils, and are embedded in the surface of the substrate or enamels. This phenomenon is particularly marked for utensils based on soft light-colored metal, such as pots or pans with aluminum or stainless steel bottoms.

With time, these embedded particles end up degrading the aesthetic appearance of the enamels, in particular enamels having a low level of contrast with the mineral substrate, such as dark- or black-colored enamels on a dark or black mineral substrate. In the long term, such aesthetic degradation is detrimental to a positive perception of the product by the customers.

On the other hand, with the development of so-called "flexible" cooking surfaces, that is, surfaces on which the cooking utensils can be placed anywhere to heat them, or in other words, on which there are no dedicated heating zones, the utensils are moved more frequently on the cooking surface. The aesthetic degradation caused by the metal friction then becomes more marked or occurs more quickly.

Finally, the accumulation of embedded metal particles, when it becomes particularly visible, leads to users cleaning the surface of the glass-ceramic substrate and enamels more frequently and more vigorously. These cleanings generally have the objective of making visible metal marks and traces disappear. However, the frequency and the vigor of these cleanings have the negative consequence of causing early, significant damage to enamels. This damage in turn degrades the aesthetic appearance of the decorative enamels and reduces the durability of the cooking surfaces.

There is therefore a need for a glass-ceramic substrate comprising a decorative enamel capable of limiting the appearance of metal marks or traces.

Solution to the Technical Problem

According to a first aspect of the invention, a mineral substrate (1001) according to claim 1 is provided, the dependent claims being advantageous embodiments.

According to a second aspect of the invention, a method for manufacturing a substrate according to the first aspect of the invention is provided.

Advantages of the Invention

A notable advantage of the invention is a clear reduction in the number of metal marks and traces visible from the effect of repeated friction of the metal utensils on the enamel(s). This reduction can reach 50%, or even 70% or more, compared to a glass-ceramic substrate comprising a standard enamel.

A second advantage is that the reduction in the number of visible metal marks or traces is observed in particular for utensils based on usual lightest-colored metals such as aluminum or stainless steel.

A third advantage is that the reduction in the number of visible metal marks and traces is particularly notable for decorative enamels having a low level of contrast with the mineral substrate, such as dark- or black-colored enamels on a dark or black mineral substrate.

A fourth advantage is the ease of implementing the invention with the possibility of applying it to any chemical composition of enamel.

DETAILED DESCRIPTION OF EMBODIMENTS

Within the meaning of the invention, "enamel" is understood to mean a vitreous or composite material generally comprising an annealed glass frit wherein fillers, agents and/or coloring and/or structuring pigments may optionally be dispersed.

Within the meaning of the invention, "pattern" is understood to mean, for a given surface of the mineral substrate covered by said pattern, a discontinuous decorative grid having a covering rate of said surface strictly less than 100%, preferably less than 90%.

Within the meaning of the invention, "covering rate" of an enamel forming a pattern on a given surface of the mineral substrate is understood to mean the proportion of said given surface which is covered by said pattern. In other words, it corresponds to the ratio, expressed as a percentage, of the surface covered by the pattern on said given surface.

According to these last two definitions, a "solid" that consists of a uniform, that is to say continuous, grid, and, for a given surface of the mineral substrate, has a covering rate of 100% of said surface, is not a pattern.

Within the meaning of the invention, "ink coverage" means the ink coverage as known and defined in the field of inkjet printing. For a given individual ink, it corresponds to the number of pixels actually printed relative to the total number of printable pixels. In the case of inkjet printing, it may depend on the resolution of the printing device used.

Within the meaning of the invention, "topographical slope" is understood to mean the current measurement of the gradient, defined as the tangent of the inclination between two points of a surface located at different altitudes, or even as the tangent of the angle of gravity relative to a reference level, generally horizontal. This measurement is generally expressed as a percentage.

Within the meaning of the invention, "total roughness" is understood to mean the total roughness, denoted Rt, as defined in section 4.1.5 of the ISO 4287:1997 standard. It is defined as the sum of the largest profile peak height, Zp, and the largest profile valley depth, Zv, over the sampling length of the profile.

Figure 1:
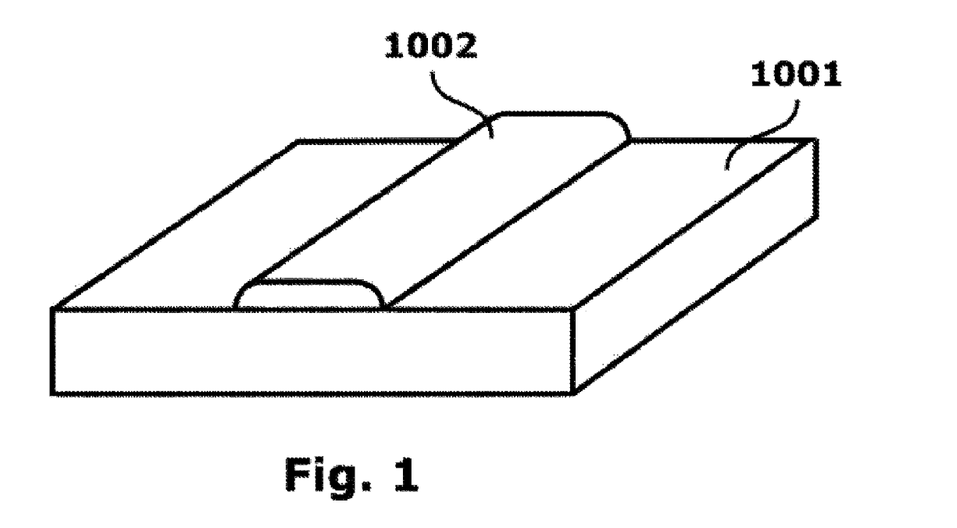
FIG. 1 is an orthographic schematic representation of a mineral substrate comprising an enamel.

As an illustrative example, with reference to FIG. 1, a mineral substrate 1001 such as those used as surfaces of cooking devices comprises the mineral substrate 1001 itself provided on at least one of its surfaces with an inorganic enamel 1002. In FIG. 1, the enamel 1002 is shown in the form of a line forming part of a pattern. It may form any suitable pattern.

An example of a pattern in the form of a periodic pattern of squares of about 1.25 mm each side, with a thickness between 1 and 3 μm and spaced from 0.75 mm. The covering rate of the inorganic enamel on the surface of the substrate is 40%.

Figure 2:
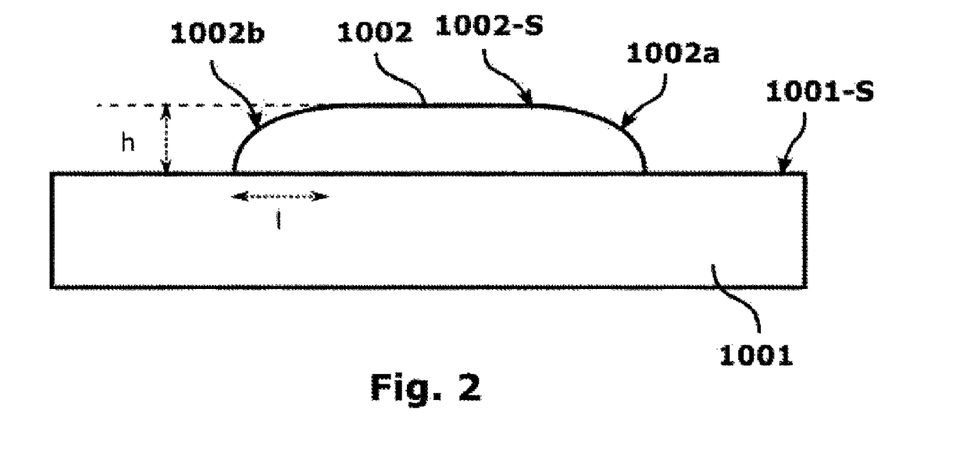
FIG. 2 is an orthographic schematic representation of the cross-section of a mineral substrate comprising an enamel.

According to a first aspect of the invention, with reference to FIG. 1 and in FIG. 2, a mineral substrate 1001 forming a pattern comprising on at least one of its surfaces an inorganic enamel 1002, characterized in that:
said inorganic enamel 1002 has a total roughness, Rt, of its surface 1002-S of less than or equal to 2 μm, and
the edge 1002*a*, 1002*b* of the inorganic enamel 1002 projecting from the surface 1001-S of the mineral substrate 1001 has a topographic slope value, expressed as a percentage, of less than or equal to 1.4%.

Without being a theoretical or practical consideration to which the invention must be reduced, a possible explanation of the remarkable advantage that the invention provides may be that the synergy, as regards the inorganic enamel, between a total surface roughness of less than 2 μm, and a topographical slope of less than 1.4%, makes it possible to improve the sliding of the metal utensils, in particular of soft metal, on the surface of said inorganic enamel, and therefore to reduce the risk of tearing off metal particles.

In accordance with the preceding definition, the topographical slope corresponds to the tangent of the gradient of the edge 1002*a*, 1002*b* of the inorganic enamel 1002 forming a pattern projecting from the surface 1001-S of the mineral substrate 1001. In other words, with reference to FIG. 2, it corresponds to the tangent of the elevation change relative to the distance of said elevation change, that is to say to the ratio, h/l, of the difference in altitude, h, between the surface 1001-S of the mineral substrate 1001 and the upper surface 1002-S of the inorganic enamel 1002, over the distance, l, between the two points considered for the difference in altitude. Expressed as a percentage, the ratio h/l is multiplied by 100.

The topographical slope of an organic enamel forming a pattern can be, according to the method and the parameters of its deposition on the surface of the mineral substrate, vary depending on the thickness of said organic enamel, on its chemical composition and/or on the size of the particles of the mixture, for example a mixture of mineral glass frit and/or mineral pigment, having been used to form it, in particular to their combination. However, these characteristics are not sufficient alone to define a given topographical slope value. In other words, two inorganic enamels of the same composition, having been obtained with the same mixture and having the same thickness, may have different topographic slopes depending on how they were deposited on the mineral substrate.

The upper surface 1002-S of the inorganic enamel 1002 is generally the largest surface and substantially parallel to the surface 1001-S of the mineral substrate 1001.

The angle of gradient, expressed in radians, is an expression of the topographical slope in the form of an angle. The angle of gradient, a, then corresponds to the value obtained by applying, to the ratio h/l, the reciprocal function, denoted arctan or $\tan^{-1}$, of the tangent function, i.e.

$$\alpha = \tan^{-1}\left(\frac{h}{l}\right)$$

The multiplication of this ratio by 180/π allows the conversion of the angle in degrees.

The value of the topographical slope is preferably the arithmetic mean of the values of the individual topographic slopes measured at different places or different locations of the edge 1002a, 1002b of the inorganic enamel 1002 projecting on the surface 1001-S of the mineral substrate 1001.

An enamel forming a pattern generally has the function of being a decorative and/or functional coating deposited on the surface of a mineral substrate for decorative, signaling and/or delineation purposes, in particular to delineate certain functional areas such as, for example, the heating and/or control areas of the cooking devices or worktops.

Various enameling methods, also called glazing or more simply decorative, and the compositions of the mineral or ceramic pastes, inks or paints used for the purposes of said enameling methods are known from the prior art, in particular in the field of enamels for mineral substrates such as glass-ceramics.

An enamel is generally obtained by heat treatment of a paste, an ink or a mineral or ceramic paint deposited on the surface of a mineral substrate using a suitable method, for example, by screen printing or inkjet printing.

The paste, the ink or the mineral or ceramic paint comprises a solid mineral phase that is finely divided and dispersed in a somewhat viscous organic medium. The organic medium allows the solid phase to be applied with the appropriate deposition method. It also has a function of suspending and/or dispersing the mineral phase in order to ensure the homogeneous and uniform distribution thereof in the decorative, signaling and/or delineation area.

The mineral substrate 1001 may be any mineral substrate capable of being stressed by metal utensils, in particular a mineral substrate capable of being used in an environment wherein kitchen utensils are used, for example as a surface of a worktop and/or of a device and/or of a cooking unit.

In some embodiments, the mineral substrate 1001 may be a glass-ceramic substrate or a mineral glass substrate. By way of example, it may be any type of glass-ceramic suitable for use as a surface of a worktop and/or of a device and/or of a cooking unit, such as lithium aluminosilicate-based glass-ceramics. It may also be any type of mineral glass, optionally tempered, suitable for the same applications, such as borosilicate or aluminosilicate glasses.

In accordance with the invention, the value of the total surface roughness of the inorganic enamel 1002 is less than or equal to 2 μm. For certain inorganic enamel compositions, lower total roughness values can be reached. Thus, in certain advantageous embodiments, the value of said total surface roughness may be less than or equal to 1.5 μm, preferably less than or equal to 1 μm. It was observed that a reduction in the total surface roughness can further reduce the visibility of the metal marks and traces.

According to the invention, the topographical slope value of the edge 1002a, 1002b of the inorganic enamel 1002 projecting at the surface 1001-S of the glass-ceramic substrate 1001 is less than or equal to 1.4%. For certain inorganic enamel compositions 1002, lower values can be reached. Thus, in certain advantageous embodiments, the value of said topographical slope may be less than or equal to 1.2%. It has been observed that a reduction in the topographical slope can further promote the sliding of the metal objects or utensils on the inorganic enamel, and therefore make it possible to further reduce the visibility of the metal marks and tracks.

Due to the reduction in the visibility of the metal marks and marks that the invention allows, the thickness of the inorganic enamel can advantageously be reduced since the need to compensate for possible damage to the enamel caused by the embedding of metal particles and/or repeated cleaning by users is less important, or even non-existent.

Thus, in certain embodiments, the thickness of the inorganic enamel 1002 may advantageously be between 1.5 μm and 3.5 μm, or even between 1.5 μm and 2 μm.

The metal marks and traces are significantly reduced for an inorganic enamel 1002 having a low level of contrast with the mineral substrate 1001, whether it has a dark appearance, in particular black-colored, or a light-colored appearance, for example white-colored. Thus, in a particularly advantageous embodiment, the relative luminance difference $\Delta L^*$, defined as the difference between the luminance $L^*$(enamel/substrate), measured in reflection, of the inorganic enamel 1002 on the mineral substrate 1001 and the luminance $L^*$(substrate), measured in reflection, of the mineral substrate 1001 without the inorganic enamel 1002, is at most 50, preferably at most 35. It may in particular be between 2 and 45, optionally between 5 and 35, these values of values corresponding to a fairly low-contrast inorganic enamel 1002 with respect to the mineral substrate 1001.

The relative luminance difference $\Delta L^*$ can also be expressed in the form of the following equation:

$$\Delta L^* = \left| L^*\left(\frac{\text{enamel}}{\text{substrate}}\right) - L^*(\text{substrate}) \right|$$

The term "luminance" is understood to mean the luminance, denoted L*, as defined and measured in the ISO 11664-4 standard. The luminance of the mineral substrate 1001, denoted L*(substrate), is measured in reflection. The luminance of the inorganic enamel 1002 deposited on the mineral substrate 1001, denoted L*(enamel/substrate), is measured in reflection.

In cooking devices or worktops, mineral substrates with which the inorganic enamels have a low contrast difference are generally substrates of dark appearance, optionally black-colored, weakly transmissive and low-scattering. Also in certain embodiments, the light transmittance, TI, of the mineral substrate 1001 is at most 17%, preferably no more than 10%, or even no more than 5%. Black mineral substrates, such as non-opalescent standard black glass-ceramics, have a light transmittance of less than 5%, in particular between 0.2% and 2%.

"Light transmittance" is understood to mean the light transmittance, denoted TI, as defined and measured in section 4.2 of the standard EN 410:1999 with the illuminant D65 and a standard observer.

In certain particular embodiments, a mineral black substrate, the luminance L*(substrate), measured in reflection, of said mineral substrate 1001 may further be less than or equal to 5, preferably less than or equal to 2. Black-colored mineral substrates, such as, for example, glass-ceramics, sold under the name KeraBlack® or KeraBlack+® by the company Eurokera, have such a luminance level.

One of the advantages of the invention is to promote the sliding of the metal utensils, in particular of soft metal, on the surface of said inorganic enamel, and therefore to reduce the risk of tearing off metal particles.

In advantageous embodiments, the coefficient of friction, also called a static and/or dynamic friction coefficient of the surface of the mineral substrate (1001) provided with said inorganic enamel (1002) is at most 0.30, preferably at most 0.25. The mineral substrates according to the invention having such static and/or dynamic coefficient of friction values generally have the best performance in terms of reducing the number of visible metal marks and traces from the effect of repeated friction of the metal utensils.

Coefficient of friction is understood to mean the coefficient of static and/or dynamic friction as defined in the standards ASTM D1894, ISO 8295:1995 and ISO 15359:1999.

The static coefficient of friction is defined as the ratio between the static friction force, that is to say the force needed to initiate a sliding movement of one surface on another, on the force applied perpendicular to these two surfaces to maintain the contact and sliding thereof.

The dynamic coefficient of friction is defined as the ratio between the dynamic friction force, that is to say the force needed to maintain a sliding movement of one surface on another, on the force applied perpendicular to these two surfaces to maintain the contact and sliding thereof.

The static and/or dynamic coefficient of friction of the surface of the mineral substrate (1001) provided with said inorganic enamel (1002) is understood to mean the static and/or dynamic coefficient of friction as can be measured on the surface of the mineral substrate (1001) on which the inorganic enamel (1002) is present.

A mineral substrate 1001 according to any of the embodiments described can advantageously be used as a surface of a cooking device, in particular an induction cooking device with a so-called "flex" surface, or a worktop, in particular a worktop in furniture equipment such as tables or work cabinets for food preparation.

According to a second aspect of the invention, a method is provided for producing a mineral substrate 1001 according to any one of the embodiments previously described, said method comprising a step of depositing an inorganic enamel 1002 by inkjet printing mineral ink onto a mineral substrate 1001, wherein the ink coverage is at least 45% and at most 85%, and the weight percentage of the solid fraction in the mineral ink used for the inkjet printing is at most 40% of said mineral ink.

By way of illustrative example, for an inkjet printing task at 800 dpi, the number of printable pixels on a square pattern of a square inch is 640,000 pixels. For a given individual ink, if only 200,000 pixels are actually printed, the ink coverage, for this given unitary ink, is 200,000/640,000, or, expressed as a percentage, 31.5%.

If several individual inks are used, for example inks of different colors, the ink coverage is the sum of the ink coverages of each of these individual inks.

The viscosity of the ink, typically between 20 and 100 Pa·s, and the volume of the drops of ink, typically between 12 and 84 pL, can also influence the ink coverage. A very fluid ink and/or a large volume of drops can cause greater coverage of the printed surface, in particular by covering pixels peripheral to those actually printed by the inkjet printing device at the chosen resolution. These parameters are generally taken into account by the inkjet printing device when the ink coverage is defined.

"Mineral ink" is understood to mean a mineral ink suitable for depositing enamels by inkjet printing. A mineral ink is generally in the form of a suspension or a colloidal dispersion of a finely divided solid mineral phase in a generally organic liquid phase. The solid mineral phase of the colloidal suspension generally comprises a glass frit and optionally a mineral pigment.

The mineral ink has a density, viscosity and surface tension compatible with inkjet printing methods. The values of these parameters depend on the inkjet printing devices used and affect the quality of the decorative patterns obtained.

The size of the grains constituting the solid mineral phase is generally micrometric, or even sub-micrometric. The liquid phase predominantly comprises a solvent, generally organic. The type and quantity of solvent partially affect the rheological properties, the surface tension and the drying behavior of the mineral ink. It is also possible to add a dispersing agent to prevent flocculation and/or sedimentation of the solid phase, as well as a surfactant in order to adjust the surface tension of the mineral ink.

The proportions by weight of the organic solvent, the dispersing agent, the surfactant and the glass frit can be adjusted so that the properties of the mineral ink are adapted to the device used for inkjet printing. The organic solvent may generally represent 80% by weight of the mixture of organic solvent, dispersing agent and surfactant of the mineral ink. The type and quantity of organic solvent can be adjusted according to the technical constraints of the inkjet printing device used and the production constraints.

In order to form an enamel using the mineral ink deposited by inkjet printing, the temperature at which the mineral ink is dried can be between 25 and 180° C. The temperature of the firing heat treatment of the enameled precursor glass may be equal to or greater than 650° C. Preferably, the temperature does not exceed 1100° C.

The organic solvent may be an organic compound that is liquid at room temperature or a mixture of organic compounds that are liquid at room temperature comprising at least one alcohol functional group.

The choice of the organic compound comprising an alcohol functional group depends on the method and/or the device used for inkjet printing. If the deposition of the mineral ink on the mineral substrate is slow, it is advantageous to use a solvent or a mixture of solvents with a low saturation vapor pressure under the usage conditions of pressure and temperature of the method and/or device. In other words, under standard temperature and pressure conditions, in order to prevent the solvent or the mixture of solvents from evaporating too quickly, its boiling point may be higher.

Non-limiting examples of organic solvents are: methylene glycol, ethylene glycol, propylene glycol, butylene glycol, methanol, ethanol, propanol, butanol, glycol ethers such as propylene glycol methyl ether or dipropylene glycol methyl ether.

The dispersing agent is preferably a copolymer or a mixture of copolymers comprising at least one acid functional group. The dispersing agent makes it possible to prevent flocculation and/or sedimentation of the solid phase. It preferably represents 3 to 7%, at most 10%, by weight of the sum of the mass percentages of the organic solvent, the dispersing agent and the surfactant. The alkylammonium salts of a copolymer comprising one or more acid functional groups are non-limiting examples of a dispersing agent.

The surfactant is preferably a polyether or a mixture of polyethers. It preferably represents 0.05% to 0.5% by weight of the sum of the mass percentages of the organic solvent, the dispersing agent and the surfactant.

The mineral ink may comprise no coloring mineral pigment. Alternatively, it may comprise a mineral pigment in order to provide an enamel hue or color. The mineral pigment makes it possible to adjust the color of the mineral ink and the enamel. The mineral pigment may be based on metal oxides and/or metals or metal alloys capable of oxidizing during heat treatment of the mineral ink to form the enamel. Non-limiting examples of mineral pigments are titanium oxide, cerium oxide, cobalt oxide, iron oxide, zirconium oxide, manganese oxide, spinels, or doped aluminas.

In one embodiment, the D90 of the particle size distribution of the solid fraction of the mineral ink is at most 2 μm, preferably between 1 μm and 2 μm. The D90 is calculated from the particle size distribution by laser diffraction methods according to the ISO 13320:2009 standard. It corresponds to the size of the particles which represent 90% of the total volume of particles of the mixture. In other words, 90% of the volume of particles of the mixture of the glass frit and of the mineral pigment consists of particles having a size of at most 2 μm, preferably between 1 and 2 μm. In advantageous embodiment, the surface tension of the mineral ink is about 26 mN/m at 25° C. It has been found that a mineral ink having a surface tension around 26 mN/m at 25° C. can facilitate obtaining an inorganic enamel on a mineral substrate in accordance with the first aspect of the invention.

All the embodiments described, whether they relate to the first aspect or the second aspect of the invention, can be combined with one another.

EXAMPLES

In four examples E1, E2, E3 and E4 of mineral substrates in accordance with the invention, three different inorganic enamels, A, B and C are deposited on a glass-ceramic plate KeraBlack+® (KB+) sold by the company Eurokera S.N.C.

Enamel A is a black-colored enamel comprising 60-70% a glass frit F, the composition of which is described in table 1, 15-20% mixed oxide of cobalt and silicon and 15-20% mixed oxide of iron, chromium, cobalt and nickel.

Enamel B is a dark gray enamel formed of a mixture of 75% by mass of enamel A and of 25% by mass of an enamel comprising 70-75% of a glass frit F, the composition of which is described in table 1 and 25-30% of titanium oxide.

Enamel C is a gray enamel formed of a mixture of 50% by mass of enamel A and of 50% an enamel comprising 70-75% a glass frit F, the composition of which is described in table 1, and 25-30% titanium oxide.

TABLE 1

|  | Mass percent (%) |
| --- | --- |
| $SiO_2$ | 35-50 |
| $Al_2O_3$ | 15-25 |
| $Li_2O$ | 1.5-4 |
| $B_2O_3$ | 22-32 |
| $Na_2O$ | 0-2 |
| $K_2O$ | 2-5 |
| $CaO$ | 1-5 |
| $ZrO_2$ | 1-4 |

In examples E1, E2 and E3, the inorganic enamels were developed according to a method in accordance with the second aspect of the invention, more particularly by inkjet printing of mineral ink with an ink coverage, Te, of 55%. The solid fraction in the mineral ink is at most 40% by weight. The D90 of the particle size distribution of the solid fraction of the mineral ink is about 1.3-1.5 μm.

In example E4, the inorganic enamel was deposited by a non-standard screen-printing method with a screen-printing paste whose D90 of the particle size distribution of its solid fraction is about 1.6 μm.

In a first counter-example CE1 not according to the invention, the inorganic enamel A is deposited by a standard screen-printing method on a glass-ceramic plate known as KeraBlack+® (KB+) marketed by the company Eurokera S.N.C. The D90 of the particle size distribution of the solid fraction of the screen-printing paste is about 5.1 μm.

In a second counter-example CE2 not according to the invention, the inorganic enamel A is deposited by a method for printing a mineral ink onto a glass-ceramic plate known as KeraBlack+® (KB+) marketed by the company Eurokera S.N.C with an ink coverage, Te, of 40%. The D90 of the particle size distribution of the solid fraction of the mineral ink is about 1.4 μm.

Figure 4:
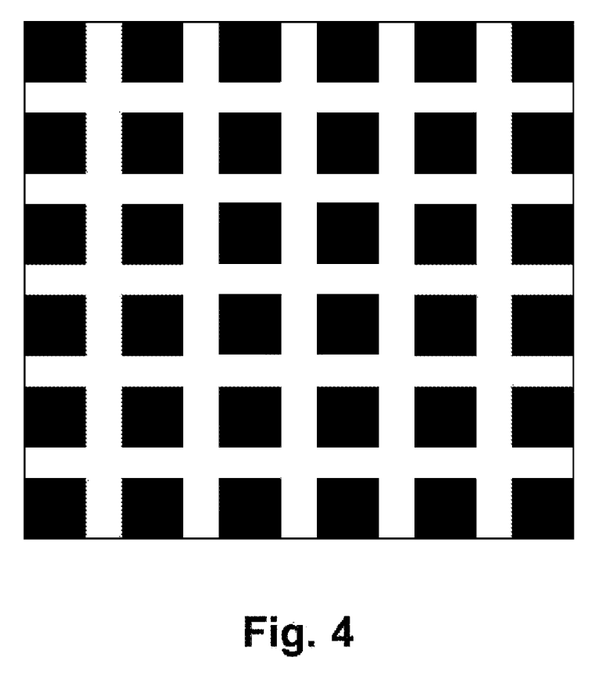
FIG. 4 is a schematic representation of an example of a pattern formed by an inorganic enamel within the meaning of the invention.

In examples E1, E4, and in the counter-example CE1, the enamels are deposited in the form of a periodic pattern of squares of about 1.25 mm side, of a thickness, of between 1 and 3 μm and spaced from 0.75 mm, as schematically shown in FIG. 4 The covering rate of the inorganic enamel on the surface of the substrate is 40%.

In examples E2 and E3 and the counter-example CE2, the enamels are deposited in the form of random units with a covering rate of the enamel on the substrate is about 25%.

The features of examples E1, E2, E3 and E4 and counterexamples CE1 and CE2 are summarized in table 2.

TABLE 2

| Tab. 2 | E1 | E2 | E3 | E4 | CE1 | CE2 |
| --- | --- | --- | --- | --- | --- | --- |
| Substrate | KB+ | KB+ | KB+ | KB+ | KB+ | KB+ |
| Enamel | A | B | C | A | A | A |

TABLE 2-continued

| Tab. 2 | E1 | E2 | E3 | E4 | CE1 | CE2 |
|---|---|---|---|---|---|---|
| Method | Mineral inkjet | Mineral inkjet | Mineral inkjet | Screen printing | Screen printing | Mineral inkjet |
| Te | 55% | 55% | 55% | — | — | 40% |
| D90 | 1.3-1.5 μm | 1.3-1.5 μm | 1.3-1.5 μm | 1.6 μm | 5.1 μm | μm |

The light transmittance of the mineral substrate alone, that is without an inorganic enamel, was measured using a Perkin Elmer Lambda 950 spectrophotometer in accordance with section 4.2 of the EN 410:1999 standard with illuminant D65 and a standard observer. The measured light transmittance, Tl, of the mineral substrate alone for examples E1, E2, E3 and E4, and counterexamples CE1 and CE2, is about 1.5%.

The luminance, denoted L*, was measured in accordance with the ISO 11664-4 standard using a BYK Gardner SPC008 spectrophotometer with an illumination angle of 45° and an observation angle at 0°.

The luminance of the mineral substrate alone, denoted L*(substrate), that is without inorganic enamel, is measured in reflection on a white background, in this case a standard background Chart 2810 supplied by BYK Gardner (L*=92.07; a*=−0.75; b*=4.91).

The luminance of the inorganic enamel deposited on the mineral substrate, denoted L*(enamel/substrate), is measured in reflection. The surface of the mineral substrate is totally covered by the inorganic enamel.

The relative luminance difference ΔL* is calculated using the following equation:

$$\Delta L^* = \left| L^*\left(\frac{enamel}{substrate}\right) - L^*(substrate) \right|$$

The total surface roughness, Rt, of the inorganic enamel of each example E1, E2, E3 and E4, and counterexamples CE1 and CE2 was measured using a Mitutoyo SJ-400 mechanical probe according to section 4.1.5 of ISO standard 4287:1997.

The topographical slope, Pt, of the inorganic enamel projecting from the surface of the glass-ceramic substrate is calculated using a surface profile. The surface profile is measured using a Mitutoyo SJ-400 mechanical probe equipped with a PC75, non-Gaussian filter applied to the parameter Wt.

Figure 3:
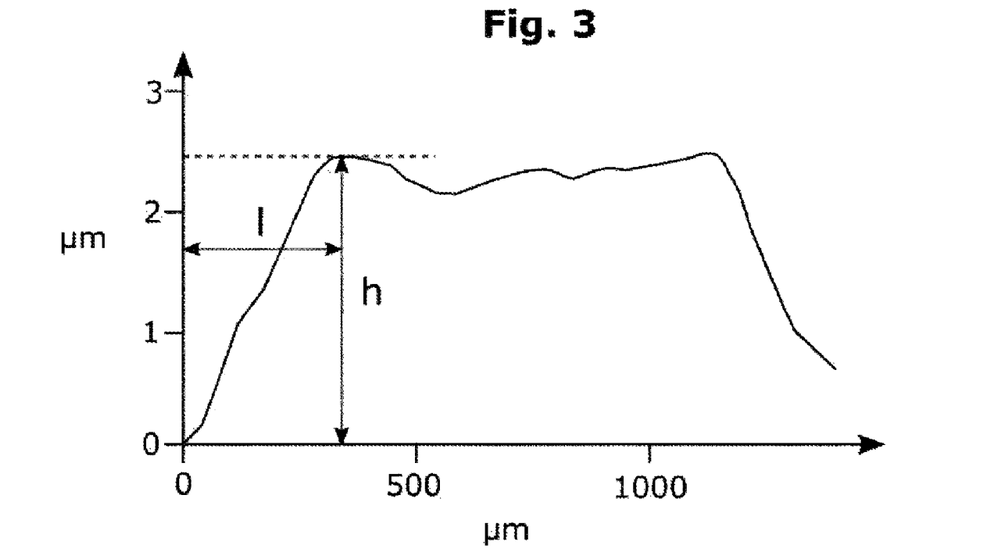
FIG. 3 is an example of a surface profile of an inorganic enamel on a mineral substrate according to the invention.

An illustrative example of a surface profile measurement on an inorganic enamel on the surface of a mineral substrate according to the invention is shown in FIG. 3.

The profile is measured on the edge of the enamel projecting at the surface of the mineral substrate over a length of 15 mm. The enamel has a polygonal geometric shape. The topographical slope, corresponding to the tangent of the elevation change between the surface of the mineral substrate and the so-called effective surface of the enamel, is calculated using the formula:

$$Pt = \frac{h}{l} \times 100$$

wherein h is the difference in height between the surface of the mineral substrate and the effective surface of the inorganic enamel, and generally corresponds to the thickness of the enamel relative to the surface of the mineral substrate, and l is the length of the elevation change.

It is proceeded, on the same inorganic enamel, with at least three measurements of topographical slope at different locations or different locations of the edge of the enamel projecting from the surface of the mineral substrate. An arithmetic mean value, Ptm, of the topographical slope is calculated from these at least three measurements.

Figure 5:
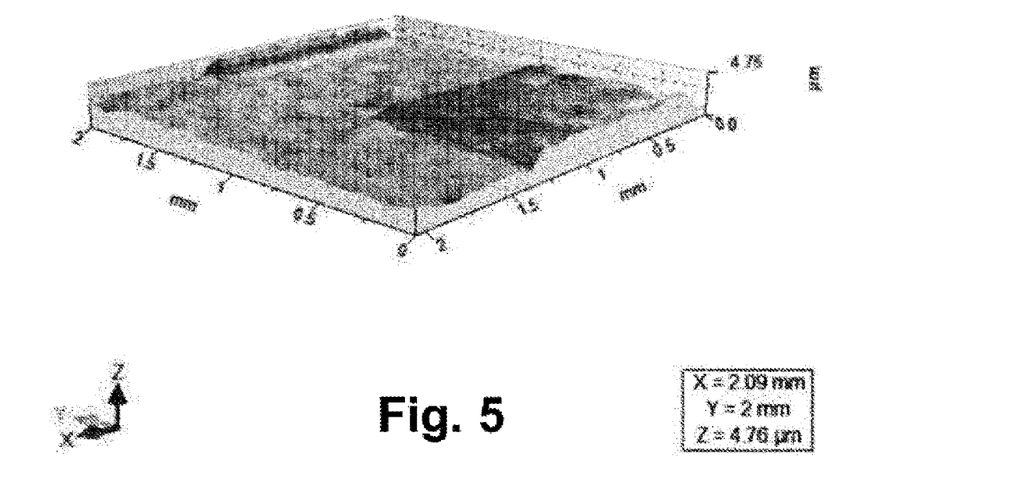
FIG. 5 is a first example of 3D representation of topographical profiles on examples according to the invention.
Figure 6:
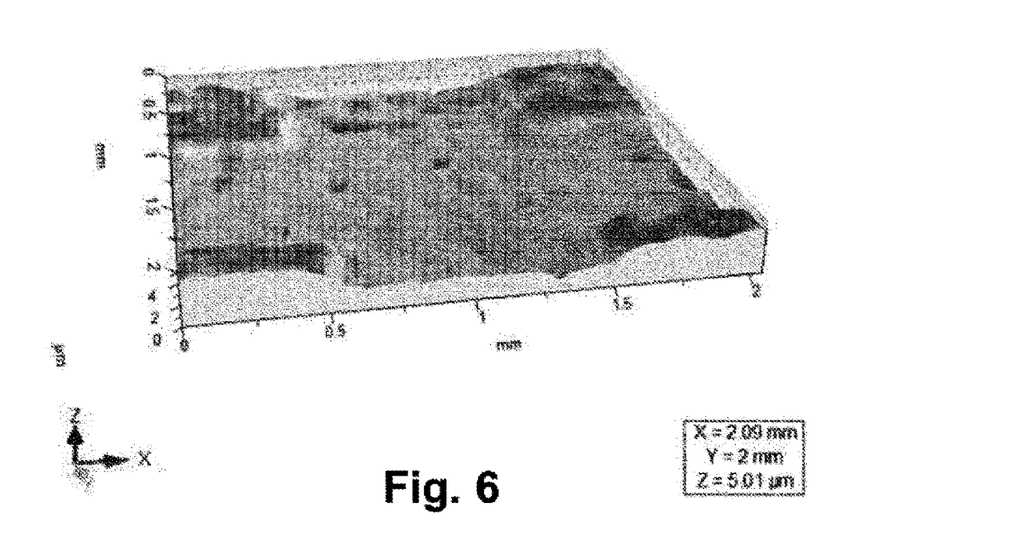
FIG. 6 is a second example of 3D representation of topographical profiles on examples according to the invention.

FIGS. 5 and 6 are examples of 3D representation of topographical profiles measured using a Taylor Hobson 3D surface profilometer from the company AMETEK on the examples in accordance with the invention, and from which surface profile measurements can be carried out.

The visibility of the metal friction was evaluated using the following protocol. A pot made of stainless steel or aluminum with a diameter of 20 cm and a weight of 3 kg is positioned inclined on the mineral substrate provided with the inorganic enamel, then is moved at a speed of about 0.40 m/s in 10 back-and-forth movements. The stainless steel pot has a Vickers hardness of 200 HV.

The level of metallic friction marks is evaluated according to two different methods: a visual analysis evaluation method, and an image analysis evaluation method.

According to the first method of visual analysis, the degradation, D, of the enamel is evaluated visually according to a scale of 0 to 5 at a distance of 60 cm under normal observation conditions. The degree 5 corresponds to a significant visibility of the embedded metal particles and the degree 0 corresponds to a visible absence of metal marks or traces. In other words, the lower the degree, the less the metallic friction traces or marks are visible to the naked eye.

According to the second image analysis evaluation method, a digital photographic image is first taken of a defined area of the enamel under the artificial light of 3-color light-emitting diodes in a light box suitable for this purpose.

The digital photographic image is then subject to digital processing of converting the grayscale image, from which an average value of the gray level, Vm, is calculated.

This same operation was carried out for an area of the enamel having undergone a metallic friction and an area of the enamel having undergone no metallic friction. The difference ΔVm between the values Vm obtained for each of these two areas is calculated. The higher the value of the parameter ΔVm, the higher the number of metal particles embedded in the enamel.

In parallel, the same photographic image is the subject of a digital binarization processing from which a visibility index, Iv, is calculated, defined as the ratio of the number of pixels of greater intensity, that is to say of value 1, to the total number of pixels. The higher this ratio Iv, the higher the visibility of the embedded metal particles in the enamel.

The image size is 3264×2448 pixels for an enamel analysis zone size comprised in 400,000 and 450,000 pixels. This corresponds to about 10×13 squares of the pattern for examples E1, E4 and counter-example CE1.

The static and dynamic coefficients of friction, respectively denoted Fs and Fd, were measured according to the standards ASTM D1894, ISO 8295:1995 and ISO 15359:1999 on an AFT instrument measuring the coefficient of friction marketed by the company Hanatek Instruments®. The friction head is a stainless steel washer 36 mm in diameter and 2 mm thick NFE 25.513 from the company Berner®. The measurements were carried out with a speed of movement of the friction head of 500 mm/min over a travel length of 50 mm.

Before any measurement of the friction coefficient, the samples are cleaned beforehand using Clin'Glass detergent marketed by Laboratoires Prodene Klint®. Four measurements are carried out on each sample and their average is calculated.

For these measurements, the inorganic enamel on the substrate surface has a random pattern for examples E2 and E3 and counter-example CE2, and a periodic pattern of squares of about 1.25 mm on a side for examples E1, E4 and for counter-example CE1.

All of the results are compiled in the table 3. The values of the parameters D, ΔVm and Iv are reported for the metal friction using a stainless steel (stainless) and aluminum (alu) pot and are respectively annotated with "stainless" and "alu".

TABLE 3

| Tab. 3 | E1 | E2 | E3 | E4 | CE1 | CE2 |
|---|---|---|---|---|---|---|
| E (μm) | 1.7 | 1.8 | 1.9 | 1.7 | 1.7 | 2.7 |
| Rt (μm) | 1.0 | 1.0 | 1.2 | 1.2 | 4 | 1.14 |
| Ptm (%) | 0.95 | 0.86 | 1.05 | 1.12 | 2.25 | 1.68 |
| D - stainless | 1 | 0 | 0 | 3.5 | 5 | 1.5 |
| D - alu | 1 | 0 | 0 | 4 | 5 | 4 |
| ΔVm - stainless (UA) | 2.0 | 0 | 0 | 2.8 | 8.9 | 5.3 |
| ΔVm - alu (UA) | 2.0 | 0 | 0 | 3.8 | 8.0 | 4.3 |
| Iv - stainless (%) | 1.03 | 0 | 0 | 1.05 | 6.34 | — |
| Iv - alu (%) | 0.55 | 0 | 0 | 2.23 | 7.03 | — |
| ΔL* | 13.3 | 31.0 | 45.0 | 8.8 | 7.2 | 12.3 |
| Fs | 0.23 | 0.13 | 0.19 | 0.20 | 0.52 | 0.16 |
| Fd | 0.17 | 0.10 | 0.14 | 0.17 | 0.51 | 0.11 |

The results of table 3 shows that the number, and therefore visibility, of the metal marks and traces is more reduced for examples E1, E2, E3 and E4 in accordance with the invention than for counterexamples CE1 and CE2. Indeed, regardless of the parameter, D, ΔVm and Iv, considered for friction using a stainless steel (stainless) or aluminum (alu) pot, the values are lower for the examples according to the invention. The value of the parameters ΔVm and Iv decreases from 75% to 92%, meaning that the visibility of the metal marks and traces is reduced as much as possible.

The comparison of the results of example E1 with those of example E4 shows that the parameter values, D, ΔVm and Iv are lower when a manufacturing method according to the second aspect of the invention is used. The manufacturing method according to the invention therefore makes it possible to obtain better performance, in terms of reducing the visibility of the marks and metal marks, that a screen-printing method. The use of a screen printing method remains possible.

The comparison of the results of examples E1, E2, and E3 show that the visibility of the metal traces and marks remains very reduced even for inorganic enamels having a low level of contrast with the mineral substrate, in particular of dark appearance with an ΔL* of less than 35, in particular black-colored with an ΔL* of less than 15.

As an additional illustration of the features and advantages of the invention, several examples derived from the prior art were reproduced in the form of counter-examples, the characteristics of which are reported in Table 4.

TABLE 4

| Reference | | Composition of the enamel | Pattern | Covering rate |
|---|---|---|---|---|
| CE3 | EP 3067334 A1 | Farbe 1 Table 3; Type A | Punkmuster 11 FIG. 3 | 11% |
| CE4 | EP 3067334 A1 | Farbe 1a Table 3; Type A | Punkmuster 11 FIG. 3 | 11% |

TABLE 4-continued

| Reference | | Composition of the enamel | Pattern | Covering rate |
|---|---|---|---|---|
| CE5 | EP 3067334 A1 | Farbe 6 Table 3; Type A | Punkmuster 11 FIG. 3 | 11% |
| CE6 | EP 3067334 A1 | Farbe 1 Table 3; Type A | Punkmuster 12 FIG. 3 | 44% |
| CE7 | EP 3067334 A1 | Farbe 1a Table 3; Type A | Punkmuster 12 FIG. 3 | 44% |
| CE8 | EP 3067334 A1 | Farbe 6 Table 3; Type A | Punkmuster 12 FIG. 3 | 44% |
| CE9 | FR 2 858 974 A1 EP 3067334 A1 | Pigment 2.7% Table 4; frit claim 2 | Punkmuster 11 FIG. 3 | 11% |
| CE10 | FR 2 858 974 A1 EP 3067334 A1 | Pigment 2.7% Table 4; frit claim 2 | Punkmuster 12 FIG. 3 | 44% |
| CE11 | WO 2019/219691 A1 | Example E1 | Same as CE1 | 40% |
| CE12 | WO 2019/219691 A1 | Example E2 | Same as CE1 | 40% |

The counterexamples CE3-CE8 are taken from EP 3 067 334 A1 [SCHOTT AG [DE]] 14.09.2016. Examples CE3-CE5, on the one hand, and counterexamples CE6-CE8, on the other hand, respectively have three different enamel compositions (Farbe 1, Farbe 1a and Farbe 6). These two series of counterexamples are deposited according to two different patterns (Punkmuster 11 and Punkmuster 12).

Counterexamples CE7 and CE9 have the same enamel composition taken from FR 2 858 974 A1 [SCHOTT AG [DE]] 25.02.2005. For comparison's sale, they are deposited according to two different units (Punkmuster 11 and Punkmuster 12) taken from EP 3 067 334 A1 [SCHOTT AG [DE]] 14.09.2016.

Counterexamples CE11 and CE12 respectively present the compositions of examples E1 and E2 of WO 2019/219691 A1 [EUROKERA [FR]] 21.11.2019. For comparison purposes, they are deposited according to a pattern of lines of a width of 0.6 mm with a covering rate of 55%.

The enamels of counterexamples CE3-CE12 may have chemical compositions and/or particle sizes of the mixture, for example a mixture of mineral glass frit and/or mineral pigment, having been used to form them, similar to examples E1-E4 according to the invention.

The enamels of examples CE3-CE8 were deposited according to the methods described in the documents of which they are extracted.

The total roughness and the topographical slope of counterexamples CE1-CE3 were measured and/or determined according to the same methods as those used for examples E1-E4 and counterexamples CE1 and CE2. The results are reported in Table 5 shown in FIG. 7.

TABLE 5

Figure 7:
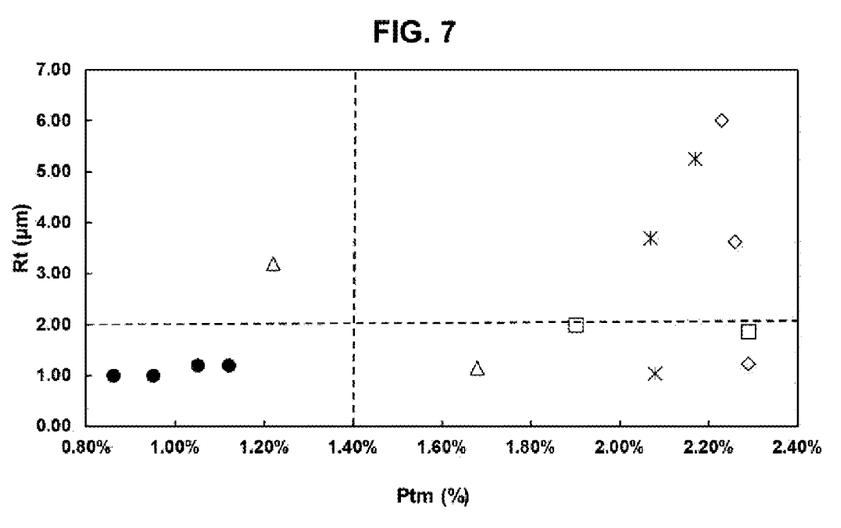
FIG. 7 is a graphic representation of the total roughness as a function of the topographical slope for examples according to the invention and of the counter-examples.

| | Rt (μm) | Ptm (%) | Symbols FIG. 7 |
|---|---|---|---|
| CE3 | 6 | 2.23 | Empty diamond |
| CE4 | 3.62 | 2.26 | Empty diamond |
| CE5 | 1.22 | 2.29 | Empty diamond |
| CE6 | 5.25 | 2.17 | Star |
| CE7 | 3.69 | 2.07 | Star |
| CE8 | 1.03 | 2.08 | Star |
| CE9 | 1.99 | 1.90 | Empty square |
| CE10 | 1.86 | 2.29 | Empty square |
| CE11 | 3.2 | 1.22 | Empty triangle |
| CE12 | 1.14 | 1.68 | Empty triangle |

In FIG. 7, examples E1 to E4 according to the invention are represented by solid round symbols, counterexamples CE3-CE5 by empty diamonds, counterexamples CE6-CE8 by stars, counterexamples CE9-CE10 by empty squares, and counterexamples CE11 and CE12 by empty triangles. As visual guides, the total roughness values Rt, at 2.00 µm and of topographical slope, Ptm, at 1.40% are respectively represented by a dashed vertical line and a dashed horizontal line.

FIG. 7 shows that only the examples according to the invention are located in the zone defined beneath the horizontal line and to the right of the vertical line. Counterexamples CE3-CE12 are all outside this zone. This figure therefore clearly and unambiguously shows that only the examples according to the invention have the total roughness, Rt, and topographical slope values, Ptm, respectively less than or equal to 2.00 µm and less than or equal to 1.4%.

The invention claimed is:

1. A mineral substrate comprising, on at least one of its surfaces, an inorganic enamel forming a pattern, wherein:
   said inorganic enamel has a total surface roughness, Rt, of its surface of less than or equal to 2 µm, and
   an edge of said inorganic enamel protruding from the surface of the mineral substrate has a topographic slope value, expressed as a percentage, of less than or equal to 1.4%.

2. The mineral substrate according to claim 1, wherein a value of the total surface roughness is less than or equal to 1.5 µm.

3. The mineral substrate according to claim 2, wherein the value of the total surface roughness is less than or equal to 1 µm.

4. The mineral substrate according to claim 1, wherein a value of said topographic slope is less than or equal to 1.2%.

5. The mineral substrate according to claim 1, wherein a thickness of the inorganic enamel is between 1.5 µm and 3.5 µm.

6. The mineral substrate according to claim 5, wherein the thickness of the inorganic enamel is between 1.5 µm and 2 µm.

7. The mineral substrate according to claim 1, wherein a relative luminance difference ΔL*, defined as the difference between the luminance L*(enamel/substrate), measured in reflection, of the inorganic enamel on the mineral substrate and the luminance L*(substrate), measured in reflection, of the mineral substrate without the inorganic enamel, is at most 50.

8. The mineral substrate according to claim 7, wherein the relative luminance difference ΔL* is at most 35.

9. The mineral substrate according to claim 1, wherein a luminance L*(substrate), measured in transmission, of said mineral substrate is less than or equal to 5.

10. The mineral substrate according to claim 1, wherein a light transmission of the mineral substrate is at most 17%.

11. The mineral substrate according to claim 10, wherein the light transmission of the mineral substrate is at most 10%.

12. The mineral substrate according to claim 11, wherein the light transmission of the mineral substrate is at most 5%.

13. The mineral substrate according to claim 1, wherein a static and/or dynamic coefficient of friction of the surface of said mineral substrate provided with the inorganic enamel is at most 0.30.

14. The mineral substrate according to claim 13, wherein the static and/or dynamic coefficient of friction of the surface of said mineral substrate provided with the inorganic enamel is at most 0.25.

15. The mineral substrate according to claim 1, wherein the mineral substrate is a glass-ceramic substrate or a mineral glass substrate.

16. A method for producing a mineral substrate according to claim 1, comprising depositing an inorganic enamel by inkjet printing mineral ink onto a mineral substrate, wherein an inking rate is at least 45% and at most 85%, and a weight percentage of the solid fraction in the mineral ink used for the inkjet printing is at most 40% of said mineral ink.

17. The method according to claim 16, wherein a surface tension of the mineral ink is approximately 26 mN/m at 25° C.

18. A use of a mineral substrate according to claim 1 as a surface of a cooking device or worktop.

* * * * *